Aug. 22, 1933.   R. A. FESSENDEN   1,924,032
HEIGHT INDICATOR
Filed May 4, 1929
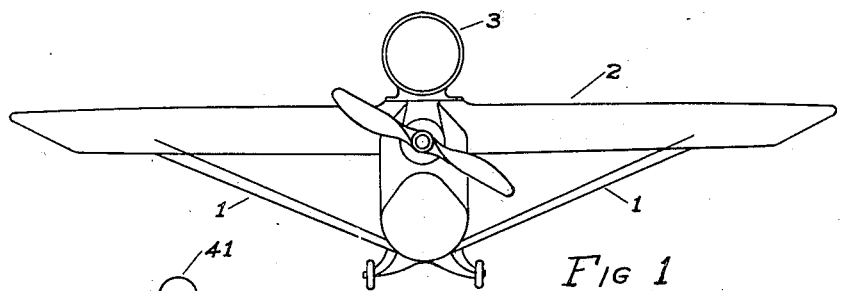
Fig 1
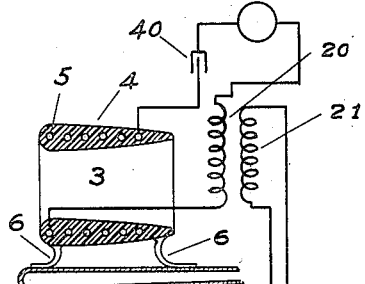
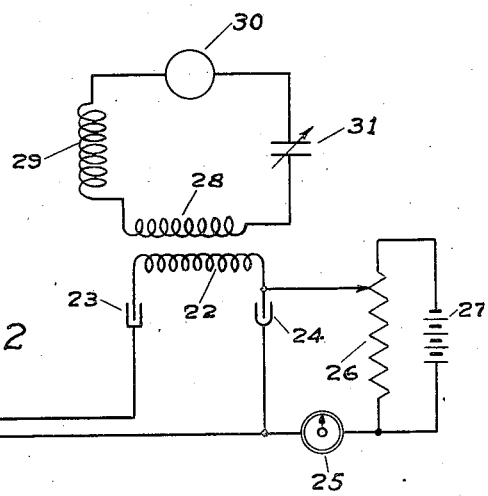
Fig 2
Fig 4
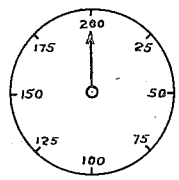
Fig 3
INVENTOR
Reginald A. Fessenden
By Ezekiel Wolf
ATTORNEY Patented Aug. 22, 1933

1,924,032

UNITED STATES PATENT OFFICE 1,924,032

HEIGHT INDICATOR

Reginald Aubrey Fessenden, Wistowe Flatts, Bermuda

Application May 4, 1929. Serial No. 360,461

4 Claims. (Cl. 177—352)

The present invention relates to methods and means for determining the height above ground of aircraft or the like and is related to my prior application Serial No. 530,162, filed January 18, 1922, in the United States Patent Office, wherein certain features of the present application have been disclosed and discussed.

In my application Serial No. 530,162, the capacity terminating surfaces of the antenna are shown in the figure as 16 and 17, and for the most part are mounted on the aircraft wings as shown in my Patent No. 1,153,124, granted October 26, 1915. While this is applicable to all types of aircraft, greater efficiency, reliability and accuracy is obtained by my present invention, herein described, especially with all metal aircraft, in which latter I use the wings or body or other structure as the antenna. This gives greater accuracy, as the antenna surfaces are larger, and greater reliability, as there are fewer, or no surfaces to be insulated, and greater efficiency, because of the low oscillatory resistance of the large wing or body surfaces.

The invention will be best understood from the following description of the invention as applied to an all metal airplane, and by reference to the drawing, in which:

Figure 1 shows a view of the invention as applied to a plane;

Figure 2 shows diagrammatically the details of the circuit and a section through a part of the plane;

Figure 3 shows the indicator; and

Figure 4 shows a modification.

In Figure 1 is shown an aircraft 1 which, in the present instance is an airplane, but the invention is applicable as well to aircraft other than airplanes, for instance dirigibles, rigid or otherwise, as will appear later. The plane may be an all metal plane, or may have an all metal wing or other conducting surface 2. Symmetrical with the wing 2 is mounted a coil 3 which is stream lined as shown in section in Figure 2, and which has its turns 4 embedded or moulded in bakelite 5 or some other similar and suitable material. The coil 3 is mounted preferably with its axis perpendicular to the wing length and just above but close to the wing by means of brackets 6, 6 or by any suitable means, but it may, if desired, be mounted perpendicularly to the body or fuselage.

The circuit shown in Figure 2 is similar to that shown in the application Serial No. 530,162 mentioned above, and comprises a local oscillating circuit composed of the oscillator 30, the variable tuning condenser 31, the inductance 29 and the coupling transformer 28.

The coupling transformer couples the local oscillating circuit to the indicator circuit, which comprises the secondary 22 of the transformer, the condenser 23, the liquid barreter 24 or any other suitable rectifier, the battery 27, the potentiometer 26, the indicator 25 and the secondary 21 of the second coupling transformer 20, all connected in circuit in the manner indicated in the drawing.

The coil 3 is coupled electrically to the wing of the plane, the coupling being as loose or close as is determined experimentally best, so that any variation in the natural frequency of the antenna circuit produces a change in frequency of the oscillating circuit comprising the coil 3, the primary of the transformer 20, the capacity 40 and the oscillator 41.

The frequency of the oscillator 41 varies with the constants of its circuit and of the coupled antenna circuit. As the antenna circuit constants vary, so will the period of the oscillator vary.

The indicating circuit may have any type of an indicator well known in the art, but I prefer to use one operated by the beat frequency set up between the constant oscillating circuit 30, 31, 28 and 29 and the oscillating circuit 3, 20, 40 and 41 varied by the change of the antenna circuit functions. This frequency indicator may be of any type and may have its scale graduated to indicate the height of an aircraft on a circular dial, as indicated in Figure 3.

If the plane is not an all metal plane, the modification shown in Figure 4 might be used. Figure 4 shows a section of a plane and 42 indicates wires in section, which wires run the length of the wing and have induced into them current from the coil 3. The coil 3 is mounted preferably in the center of the plane, midway between the wing tips. This method of mounting the coil 3 uses the wings in the most efficient manner for their natural oscillating period in free space then becomes approximately twice the wing length, and the potentials set up at opposite wing tips become a maximum.

The method and apparatus above described may be used for determining the distance between other surfaces than aircraft and ground. E. g. they may be used for determining the distance between the bottom of a ship and ground. The method and apparatus is similar to that described above, the surface 2 being in this case the skin of the ship instead of the skin of the aircraft, and the coil 3 being placed on the deck of the ship or in any other suitable position.

It should be noted that the coil 5 is coupled to the plane wings inductively by the positioning of the coil 5 in proximity to the metallic wing. The magnetic lines of force passing through the coil 3 enclose the wing 2 of the plane and when broken induce a current in the plane wing. As the frequency is a radio frequency, the method of coupling, as indicated to the left in Figure 2, is a close coupling, in fact the coupling in the manner shown in the figure may be made very near unity at the frequencies which are used.

The invention makes use of the close coupling of the coil 3 and the wing 2 in bringing about a variation of the natural frequency of the oscillating circuit embracing the oscillator 41. As the height of the wing 2 above the ground is varied, the capacity between the wing and the ground changes. This change of capacity brings about a change of antenna tuning and a corresponding variation in the oscillatory circuit 41. The effect of the coil 3 in the position shown in Figure 1 is equivalent to the method shown in the application Serial No. 530,162 of having separate condenser plates on each wing of the plane.

In Figure 1 of the present application at any instant each wing of the plane will have opposite potentials and, therefore, act as separate plates of a condenser with the ground as a common intervening plate.

Having now described my invention, I claim:

1. In the art of determining heights of aircrafts having a substantially all metal surface, electrical means symmetrically spaced with respect to said metal surface and positioned to be inductively coupled therewith to induce oscillatory current therein.

2. In the art of determining heights of aircrafts having a substantially all metal surface, electrical means positioned to be inductively coupled therewith, said metal surface having a free, natural, oscillating period of substantially twice the surface length.

3. In the art of determining heights of aircrafts, a plane having an all metal wing, a coil having its axis substantially perpendicular to the length of the wing and means for impressing an oscillatory current upon said coil, said coil being positioned adjacent to said wing.

4. In the art of determining heights of aircrafts, a plane having an all metal wing, a coil having its axis substantially transverse of the length of the plane and means for impressing an oscillatory current upon said coil, said coil being located adjacent to the center of the wing.

REGINALD A. FESSENDEN.